US012241381B2

(12) United States Patent
Ichikawa et al.

(10) Patent No.: US 12,241,381 B2
(45) Date of Patent: Mar. 4, 2025

(54) GAS MIXING DEVICE AND MOVING OBJECT

(71) Applicant: HONDA MOTOR CO., LTD., Tokyo (JP)

(72) Inventors: Azuki Ichikawa, Wako (JP); Yuichi Fukuchi, Wako (JP); Hikari Hirayanagi, Wako (JP); Takuya Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/621,750

(22) Filed: Mar. 29, 2024

(65) Prior Publication Data

US 2024/0328331 A1 Oct. 3, 2024

(30) Foreign Application Priority Data

Mar. 30, 2023 (JP) ................................ 2023-055276

(51) Int. Cl.
*F01D 25/30* (2006.01)

(52) U.S. Cl.
CPC ...... *F01D 25/305* (2013.01); *F05D 2260/209* (2013.01); *F05D 2260/213* (2013.01)

(58) Field of Classification Search
CPC ............ F01D 25/305; F05D 2260/209; F05D 2260/213
See application file for complete search history.

(56) References Cited

U.S. PATENT DOCUMENTS 4,430,046 A * 2/1984 Cirrito ...................... F04F 5/42 417/55
6,971,607 B2 * 12/2005 McColgan .............. F24F 13/04 454/76
2003/0080244 A1 5/2003 Dionne
2016/0230658 A1 * 8/2016 Hanlon .................. F02K 3/075
2017/0167380 A1 * 6/2017 Klosinski ................ F02C 7/141

FOREIGN PATENT DOCUMENTS

JP 2005-507044 A 3/2005

* cited by examiner

*Primary Examiner* — Hoang M Nguyen
(74) *Attorney, Agent, or Firm* — Rankin, Hill & Clark LLP

(57) ABSTRACT

A gas mixing device for a moving object including a discharge flow path that discharges an exhaust gas from a gas turbine engine. The discharge flow path includes a tubular portion, a communication passage that allows an inside of the tubular portion and the gas turbine engine to communicate with each other, and a plurality of guide portions that extend radially inward from the tubular portion and guide the cooling gas to a radially central portion of the tubular portion. The plurality of guide portions are spaced from each other in a circumferential direction of the tubular portion, and the extended end portions of the plurality of guide portions are spaced from each other.

20 Claims, 7 Drawing Sheets

12(14)

GAS MIXING DEVICE AND MOVING OBJECT

CROSS-REFERENCE TO RELATED APPLICATIONS

This application is based upon and claims the benefit of priority from Japanese Patent Application No. 2023-055276 filed on Mar. 30, 2023, the contents of which are incorporated herein by reference.

BACKGROUND OF THE INVENTION

Field of the Invention

The present invention relates to a gas mixing device and a moving object.

Description of the Related Art

In recent years, technology development related to a gas mixing device has been conducted to contribute to energy efficiency in order to ensure that more people have access to affordable, reliable, sustainable, and modern energy.

JP 2005-507044 A discloses a gas mixing device for mixing a cooling gas with an exhaust gas discharged from a gas turbine engine.

SUMMARY OF THE INVENTION

There is a long-felt need for a gas mixing device and a moving object that can mix the exhaust gas and the cooling gas well.

The present invention aims to solve the above-mentioned problems.

One aspect of the present invention is a gas mixing device including a discharge flow path that discharges exhaust gas from a gas turbine engine, and the gas mixing device mixing the exhaust gas flowing through the discharge flow path with a cooling gas flowing through a radiator, wherein the discharge flow path includes a tubular portion, a communication passage that allows an inside of the tubular portion and the gas turbine engine to communicate with each other, and a plurality of guide portions that extend radially inward from the tubular portion and guide the cooling gas to the radially central portion of the tubular portion, the plurality of guide portions are spaced from each other in the circumferential direction of the tubular portion, and the extended end portions of the plurality of guide portions are spaced from each other.

Another aspect of the present invention is a moving object including the above-described gas mixing device.

According to the present invention, the exhaust gas and the cooling gas can be mixed well.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE INVENTION

Figure 1:
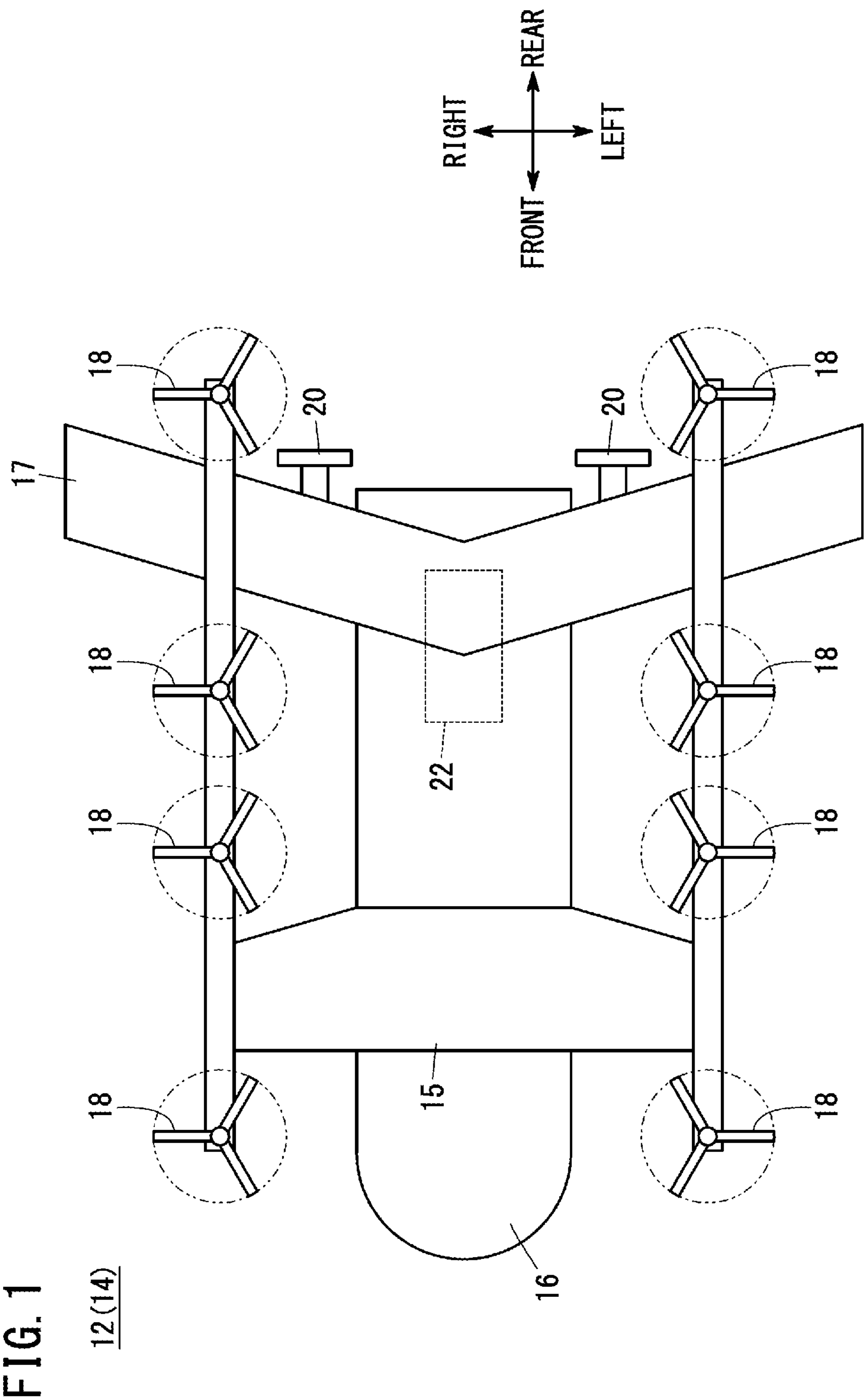
FIG. 1 is a schematic diagram of a moving object according to an embodiment of the present invention.

A gas mixing device 10 and a moving object 12 according to an embodiment of the present invention will be described below with reference to the drawings. As shown in FIG. 1, the gas mixing device 10 according to the present embodiment is mounted on, for example, an aircraft 14, which is the moving object 12. The aircraft 14 is, for example, an electric vertical take-off and landing aircraft (eVTOL). The moving object 12 may be, for example, a ship, a vehicle, etc.

The aircraft 14 includes a fuselage 16, a front wing 15, a rear wing 17, eight VTOL rotors 18, and two cruise rotors 20. The fuselage 16 extends in the front-rear direction of the aircraft 14. The front wing 15 is provided at a portion further forward than the center of the fuselage 16 in the front-rear direction. The rear wing 17 is provided at a portion further rearward than the center of the fuselage 16 in the front-rear direction. The VTOL rotors 18 generate an upward thrust force for the aircraft 14. The cruise rotors 20 generate a horizontal thrust force for the aircraft 14. The two cruise rotors 20 are attached to the rear wing 17, and the number and arrangement of each of the VTOL rotors 18 and the cruise rotors 20 can be set suitably.

Figure 2:
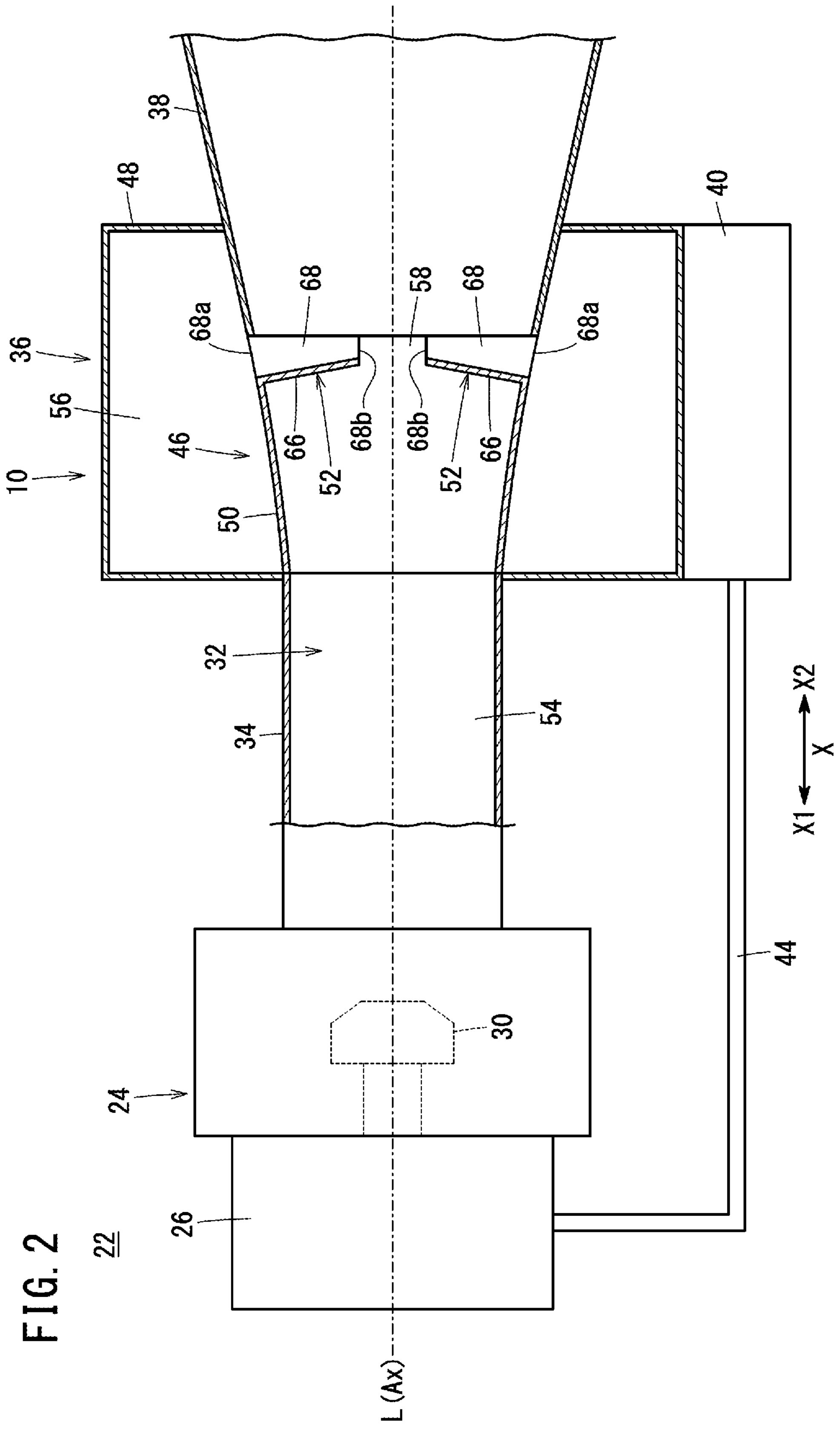
FIG. 2 is a schematic diagram of a gas mixing device.

Inside the fuselage 16, a power generation module 22 is arranged. As shown in FIG. 2, the power generation module 22 includes a gas turbine engine 24, a generator 26, and a gas mixing device 10. The gas turbine engine 24 generates high-temperature combustion gas by burning fuel. The combustion gas causes the turbine 30 of the gas turbine engine 24 to rotate. The generator 26 is coupled to the turbine 30. The generator 26 generates electric power by the turbine 30 rotating. The power generated by the generator 26 is supplied to electrical equipment. The electrical equipment may include, for example, electric motors for driving the VTOL rotors 18 and the cruise rotors 20. Also, as the electrical equipment, batteries, inverters, and the like can be mentioned. The generator 26 is arranged in the X1 direction with respect to the gas turbine engine 24. It should be noted that the X1 direction and the X2 direction, which will be described later, are shown in FIG. 2 with arrows.

The gas turbine engine 24 discharges high-temperature exhaust gas in the X2 direction as a result of the rotation of the turbine 30. The X2 direction is the opposite direction to the X1 direction. The exhaust gas flows in a spiral shape around the axis Ax of the turbine 30. In other words, the exhaust gas contains a swirling component with a negative pressure at the center of the swirling component. The swirling direction of the swirling component of the exhaust gas is, for example, clockwise when viewed from the X1 direction.

The gas mixing device 10 is coupled to the gas turbine engine 24. The gas mixing device 10 is positioned in the X2 direction with respect to the gas turbine engine 24. The gas mixing device 10 includes a discharge flow path 32 that discharges exhaust gas from the gas turbine engine 24. The gas mixing device 10 cools the exhaust gas by mixing the exhaust gas flowing through the discharge flow path 32 with the cooling gas flowing through a radiator 40, which will be described later. The cooled exhaust gas is discharged to the outside of the fuselage 16.

The discharge flow path 32 is provided with a discharge pipe 34, a cooling gas introducing portion 36, and a diffuser 38. The discharge pipe 34 extends from the gas turbine engine 24 in the X2 direction.

The cooling gas introducing portion 36 is located downstream of the discharge pipe 34. The cooling gas introducing portion 36 is provided with the radiator 40. A cooling pipe 44 through which a cooling medium for cooling the generator 26 flows is connected to the radiator 40. Outside air can circulate in the radiator 40. The radiator 40 exchanges heat between the outside air and the cooling medium guided from the cooling pipe 44. In other words, the radiator 40 cools the cooling medium with the outside air.

The outside air that has circulated through the radiator 40 is warmed by the cooling medium. However, the temperature of the outside air that has circulated through the radiator 40 is lower than the temperature of the exhaust gas. That is, the outside air that has circulated through the radiator 40 can be a cooling gas for cooling the exhaust gas. The outside air that has circulated through the radiator 40 is hereinafter referred to as cooling gas. As described above, the exhaust gas contains a swirling component with a negative pressure at the center of the swirling component. Thus, a portion with the negative pressure is generated in the discharge flow path 32. Since the negative pressure is generated in the discharge flow path 32, the cooling gas is drawn into the discharge flow path 32 via the cooling gas introducing portion 36.

The cooling gas introducing portion 36 has an introducing main body 46 and a housing portion 48. The introducing main body 46 is arranged on the downstream side (X2 direction) of the discharge pipe 34. The introducing main body 46 is made of, for example, a metal material. The introducing main body 46 includes a tubular portion 50 and a plurality (e.g., six) of guide portions 52 (see FIGS. 3-5). A communication passage 54 is provided inside the discharge pipe 34 to allow the inside of the tubular portion 50 and the gas turbine engine 24 to communicate with each other. The axis of the tubular portion 50 and the axis of the discharge pipe 34 coincide with an extension L of the axis Ax of the turbine 30.

The housing portion 48 houses the introducing main body 46. The housing portion 48 is connected to an extended end portion of the discharge pipe 34. The radiator 40 is connected to the housing portion 48. An introducing chamber 56 is provided between the outer peripheral surface of the tubular portion 50 and the housing portion 48, and the cooling gas that has circulated through the radiator 40 is guided to the introducing chamber 56. The tubular portion 50 is attached to the housing portion 48.

Figure 3:
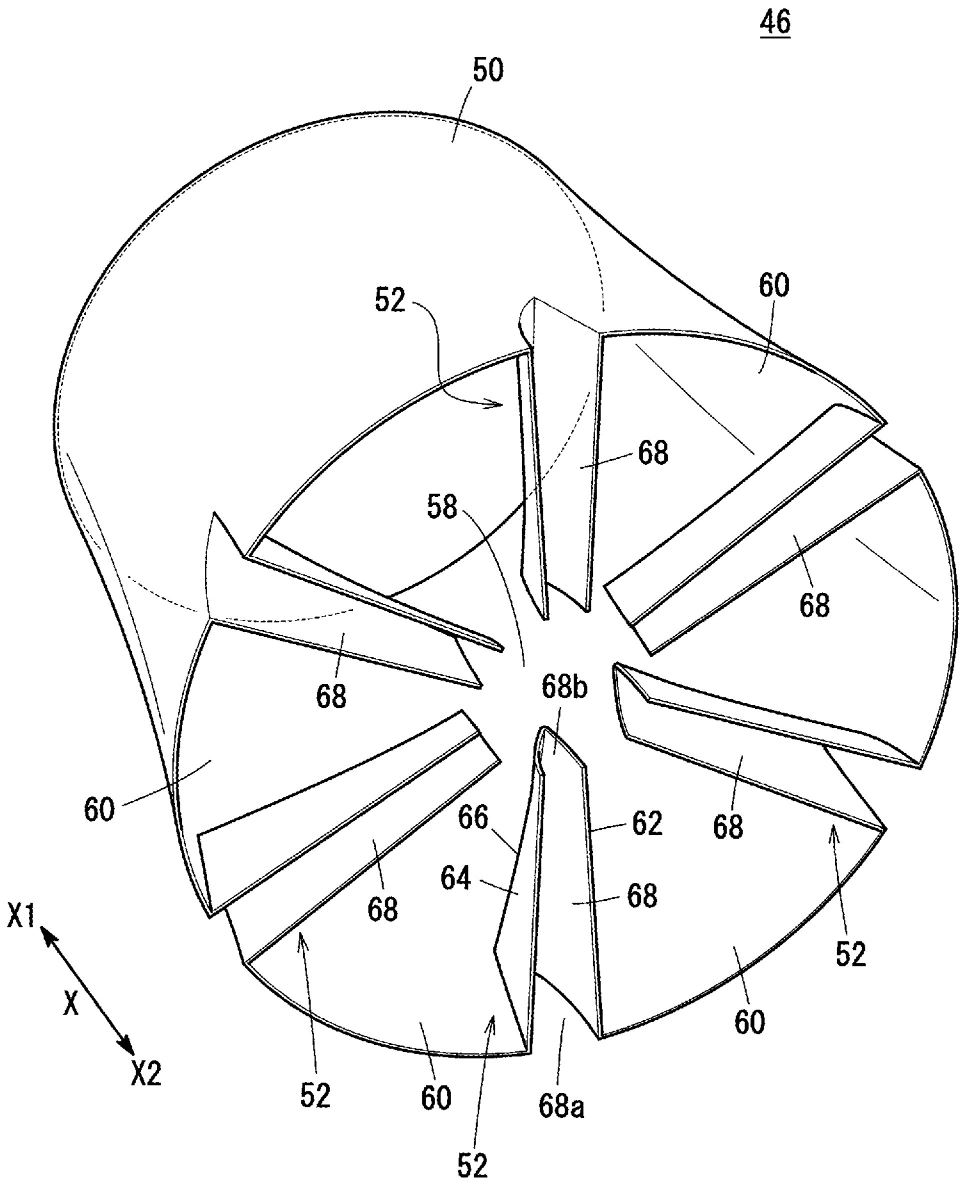
FIG. 3 is a perspective view of an introducing main body.
Figure 4:
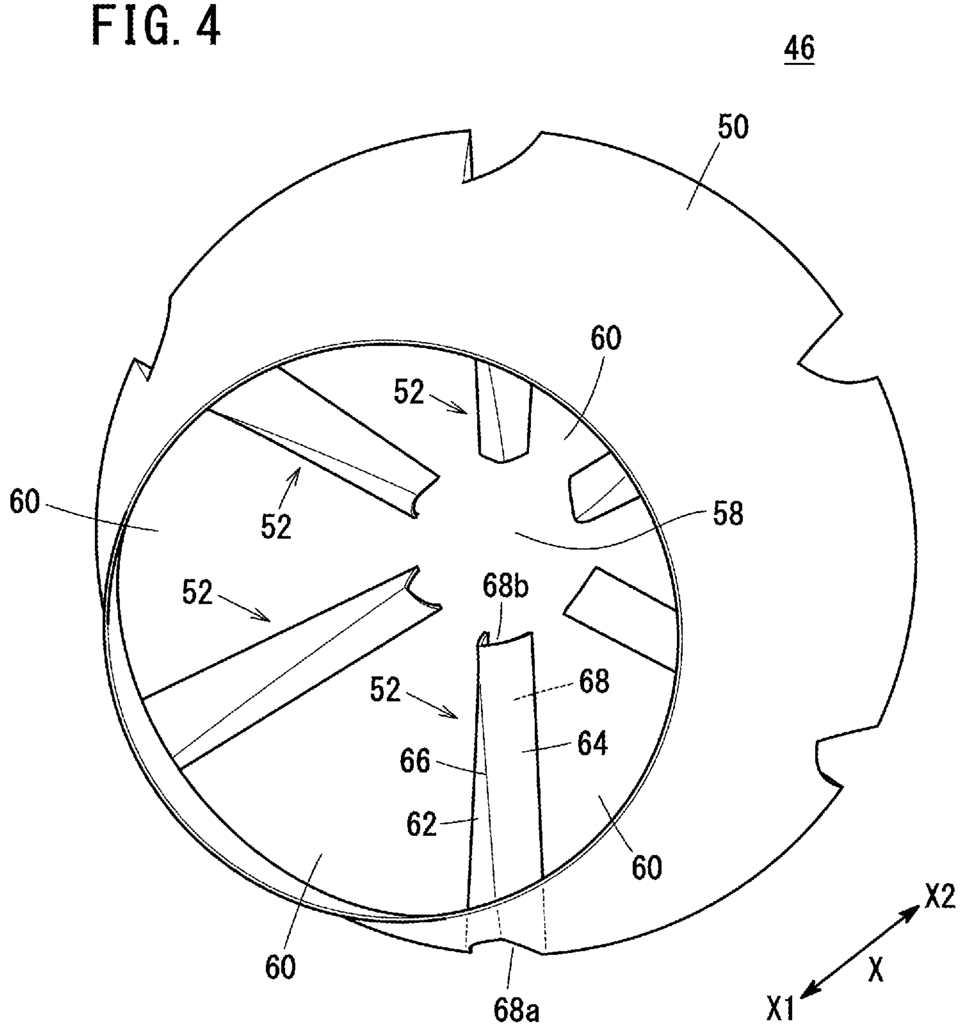
FIG. 4 is a perspective view of the introducing main body.

As shown in FIGS. 2 to 4, the tubular portion 50 is diametrically enlarged toward the downstream side of the discharge flow path 32. In other words, each of the inner diameter and the outer diameter of the tubular portion 50 gradually increases in the X2 direction. As shown in FIGS. 2 to 5, the guide portion 52 guides the cooling gas guided to the introducing chamber 56 to a radially central portion 58 of the tubular portion 50. The guide portion 52 is provided at the end portion of the tubular portion 50 on the downstream side (X2 direction) of the discharge flow path 32.

Since the pressure is negative at the center of the exhaust gas discharged from the gas turbine engine 24 to the communication passage 54, the cooling gas guided to the central portion 58 of the tubular portion 50 flows toward the upstream side of the communication passage 54. That is, the cooling gas guided to the central portion 58 of the tubular portion 50 is drawn to the upstream side of the discharge flow path 32. In the communication passage 54, the exhaust gas and the cooling gas are mixed. The exhaust gas mixed with the cooling gas flows along the outer peripheral side of the inside of the tubular portion 50 toward the downstream side of the discharge flow path 32.

Figure 5:
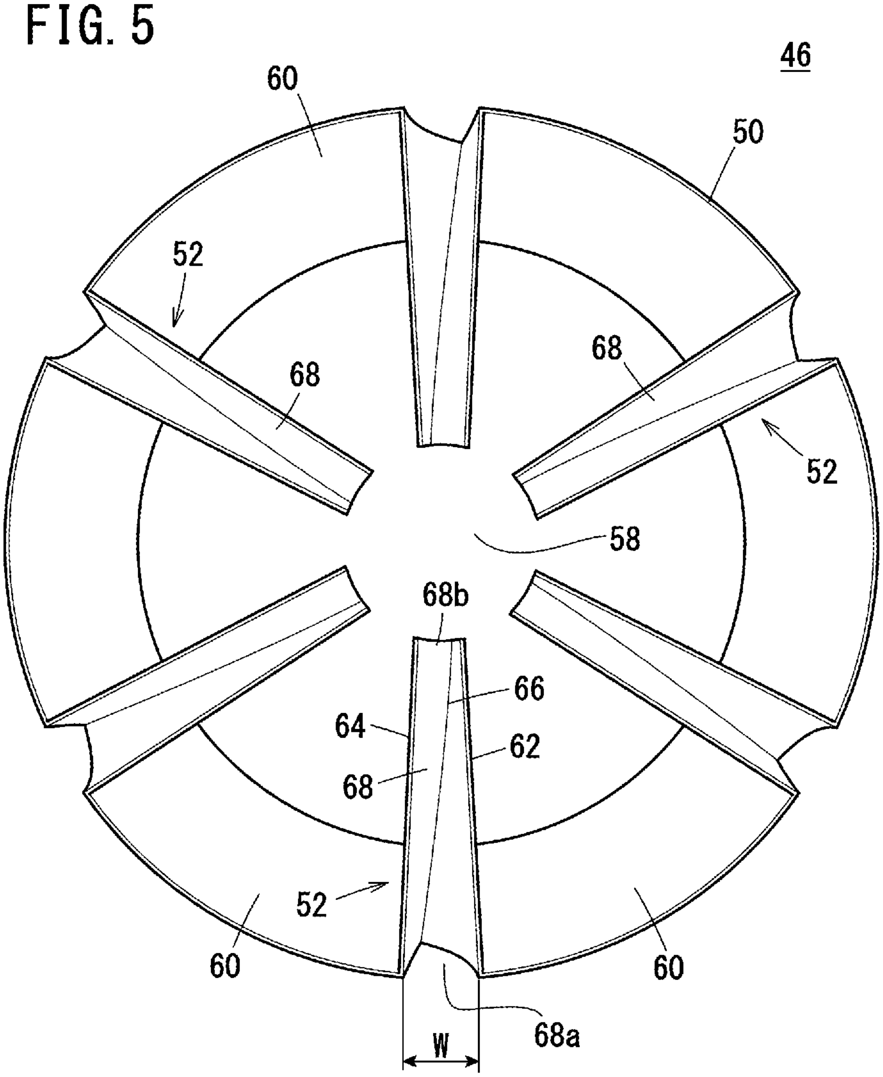
FIG. 5 is a view of the introducing main body as viewed from a downstream side of a discharge flow path.

As shown in FIGS. 3 to 5, the guide portions 52 are spaced apart in the circumferential direction of the tubular portion 50. In other words, the guide portions 52 are arranged at equal intervals in the circumferential direction of the tubular portion 50. The number of guide portions 52 can be set suitably. Between the adjacent guide portions 52, an extracting flow path 60 is formed for letting the mixed gas flow in the X2 direction.

The guide portion 52 extends radially inward from the tubular portion 50. The central portion 58 of the interior of the tubular portion 50, which is surrounded by the extended end portions of the guide portions 52, is in communication with the communication passage 54 that is upstream of the tubular portion 50 (see FIG. 2).

The guide portion 52 has a first side wall portion 62, a second side wall portion 64, and a connecting portion 66. Each of the first side wall portion 62 and the second side wall portion 64 extends radially inward from the tubular portion 50. The first side wall portion 62 and the second side wall portion 64 are arranged to face each other in the circumferential direction of the tubular portion 50.

When the introducing main body 46 is viewed from the X1 direction, the first side wall portion 62 is located in the clockwise direction with respect to the second side wall portion 64 (see FIG. 4). The connecting portion 66 connects the X1-direction end portion of the first side wall portion 62 and the X1-direction end portion of the second side wall portion 64 to each other. Inward in the radial direction of the tubular portion 50 (see FIG. 2), the connecting portion 66 is inclined in the X2 direction.

An introducing flow path 68 is provided between the first side wall portion 62 and the second side wall portion 64 to direct the cooling gas to the central portion 58 of the tubular portion 50. The introducing flow path 68 is opened toward the downstream side of the discharge flow path 32. As shown in FIG. 5, the opening width W of the introducing flow path 68 in the X2 direction is narrowed inward in the radial direction of the tubular portion 50. The opening width W of the introducing flow path 68 is the interval between the X2-direction end of the first side wall portion 62 and the X2-direction end of the second side wall portion 64 along the circumferential direction of the tubular portion 50.

The outer end 68*a* of the introducing flow path 68 is located on the outer peripheral surface of the tubular portion 50. The outer end 68*a* of the introducing flow path 68 is in communication with an introducing space. The inner end 68*b* of the introducing flow path 68 is located at the central portion 58 of the tubular portion 50. The inner end 68*b* of the introducing flow path 68 faces the radial center of the tubular portion 50. The inner ends 68*b* of the two introducing flow paths 68 located so as to sandwich the central portion 58 of the tubular portion 50 face each other. The inner end 68*b* of the introducing flow path 68 is in communication with the central portion 58 of the tubular portion 50. The size of the inner end 68*b* of the introducing flow path 68 is smaller than the size of the outer end 68*a* of the introducing flow path 68.

The guide portion 52 functions as a guide vane (wing) for removing the swirling component of the exhaust gas. That is, the guide portion 52 changes the swirling component of the exhaust gas into a straight component along the X2 direction.

As shown in FIG. 4, the guide portion 52 is twisted counterclockwise toward the radially inward direction of the tubular portion 50. The connecting portion 66 forms the leading edge of the wing. The outer surface of the first side wall portion 62 facing away from the introducing flow path 68 forms a suction surface of the wing. The outer surface of the second side wall portion 64 facing away from the introducing flow path 68 forms a pressure surface (pressure application surface) of the wing.

As shown in FIG. 2, the diffuser 38 is located downstream of the introducing main body 46. The diffuser 38 diffuses the exhaust gas guided from the extracting flow path 60 of the introducing main body 46 and discharges it to the outside of the fuselage 16. The upstream end face of the diffuser 38 is in contact with or close to the downstream end face of the tubular portion 50. Part of the diffuser 38 is inserted into the interior of the housing portion 48. The inner diameter of the diffuser 38 increases toward the downstream side. In other words, the flow path cross-sectional area of the diffuser 38 increases toward the downstream side.

Figure 6:
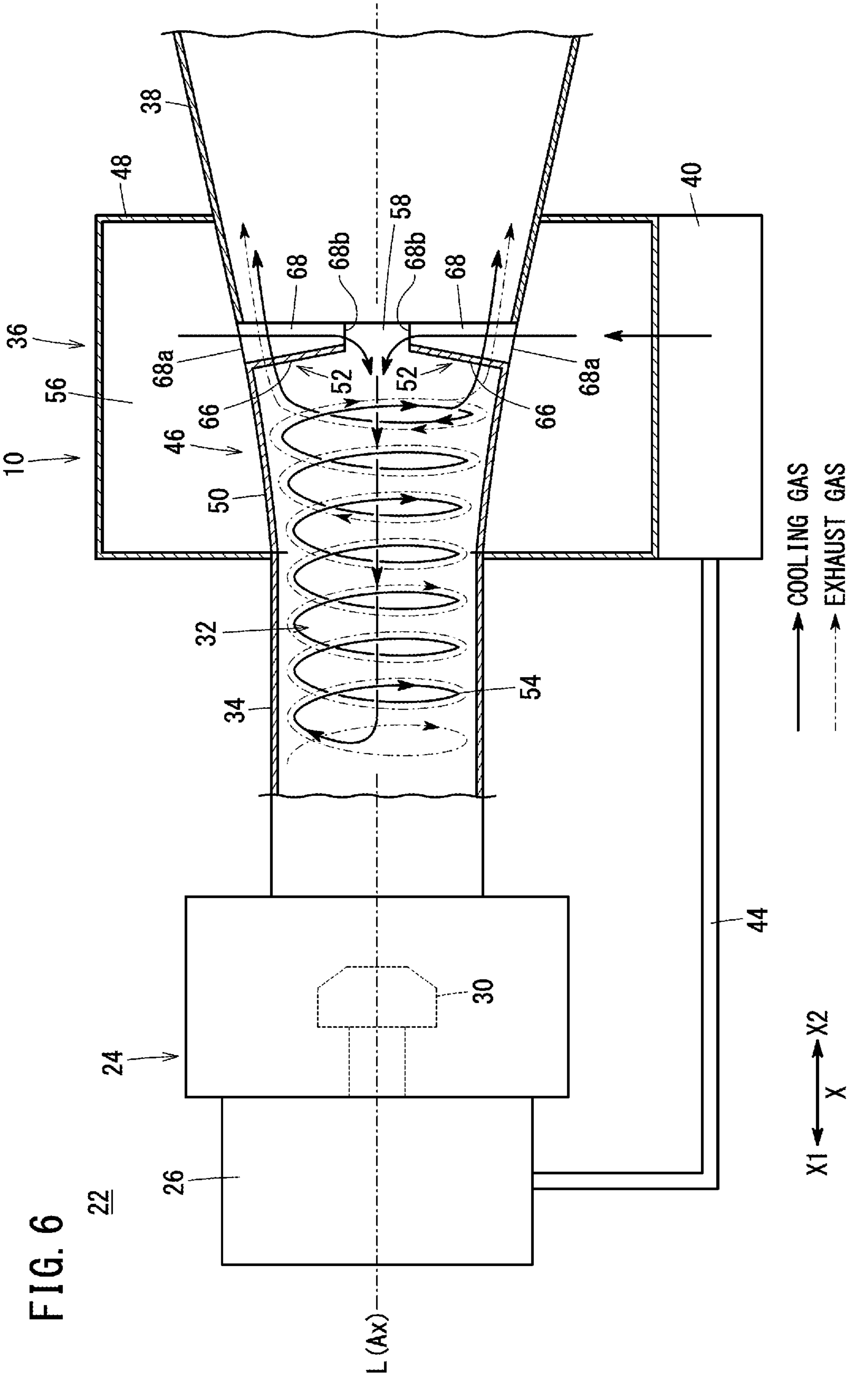
FIG. 6 is a cross-sectional explanatory view showing the flow of an exhaust gas and a cooling gas.

Next, the flow of the exhaust gas and the cooling gas in the gas mixing device 10 will be described. As shown in FIG. 6, the gas turbine engine 24 discharges high-temperature exhaust gas into the communication passage 54. In the communication passage 54, the exhaust gas has a swirling component with the negative pressure at the center. Then, the outside air is guided to the radiator 40 by the suction force generated in the discharge flow path 32. In the radiator 40, heat exchange is performed between the outside air and the cooling medium flowing through the cooling pipe 44. The temperature of the outside air warmed by heat exchange is well below the temperature of the exhaust gas discharged from the gas turbine engine 24 to the communication passage 54. Therefore, the outside air becomes a cooling gas for the exhaust gas.

The cooling gas is guided to the introducing chamber 56 of the housing portion 48 by suction force. The cooling gas guided to the introducing chamber 56 flows to the central portion 58 of the tubular portion 50 via the introducing flow paths 68 of the guide portions 52. The cooling gas flowing to the central portion 58 of the tubular portion 50 is guided to the communication passage 54 toward the upstream side of the discharge flow path 32. In the communication passage 54, the exhaust gas and the cooling gas are well mixed by the swirling component of the exhaust gas. Thereby, the temperature of the exhaust gas is reduced by the cooling gas. Thereafter, the exhaust gas mixed with the cooling gas flows on the outer peripheral side of the inside of the tubular portion 50 toward the downstream side of the discharge flow path 32 while swirling.

The exhaust gas flowing on the outer peripheral side of the inside of the tubular portion 50 touches the guide portions 52. Thus, the swirling component of the exhaust gas is changed to the straight component along the downstream direction of the discharge flow path 32. The exhaust gas from which the swirling component is removed is discharged to the outside from the extracting flow path 60 via the diffuser 38. In this case, the exhaust gas flows along the wall surface of the diffuser 38. Thus, the exhaust of the gas turbine engine 24 can be smoothly discharged, and thus the gas turbine engine 24 can be efficiently driven.

Figure 7:
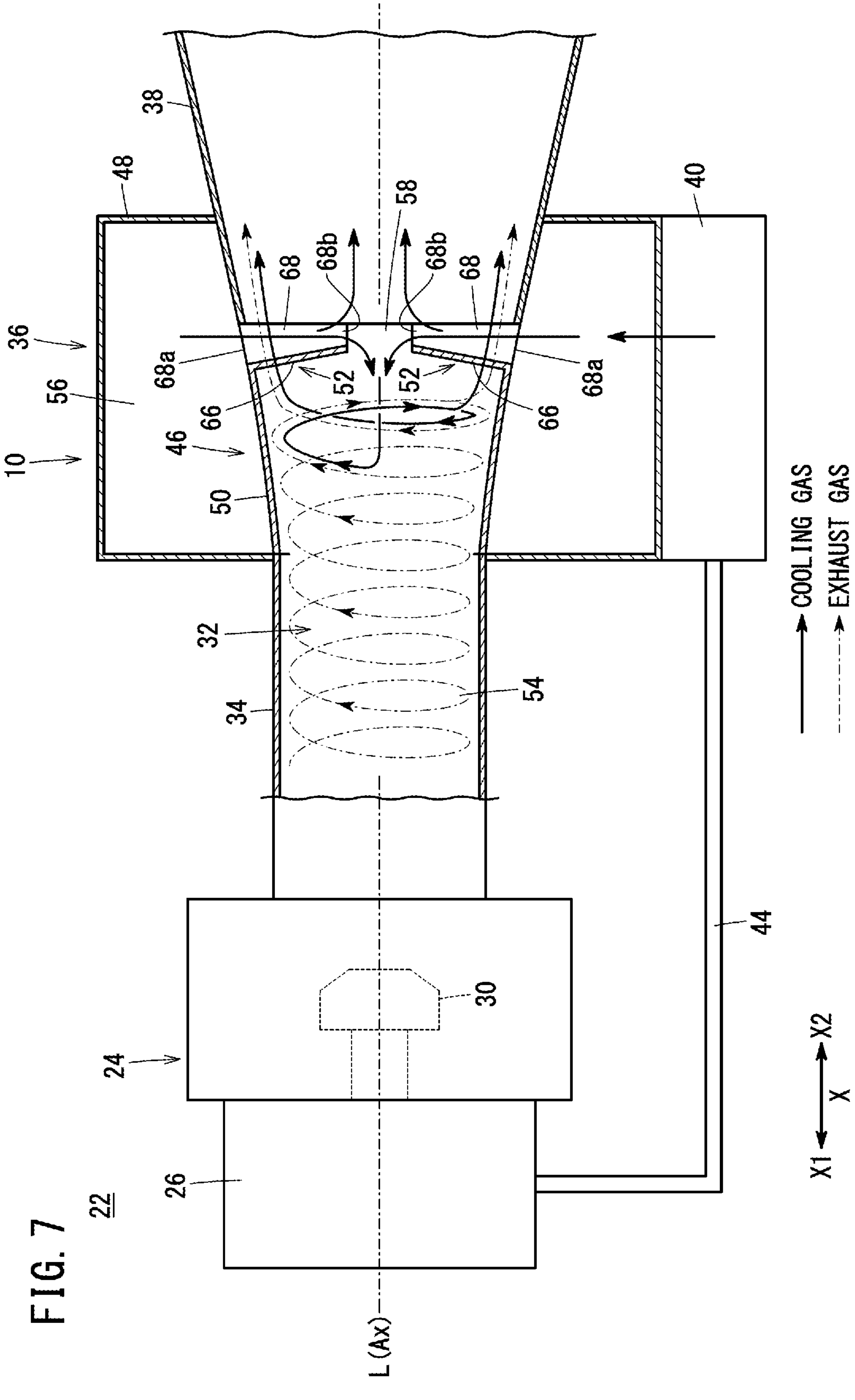
FIG. 7 is a cross-sectional explanatory view showing the flow of the exhaust gas and the cooling gas.

In the present embodiment, the flow of the cooling gas from the introducing chamber 56 to the discharge flow path 32 varies depending on the flow rate of the exhaust gas, the length of the communication passage 54, the flow path cross-sectional area of the communication passage 54, and the like. Therefore, in the present embodiment, there is a case where the cooling gas flows as shown in FIG. 7. In this case, as shown in FIG. 7, part of the cooling gas that has flowed into the introducing flow path 68 from the introducing chamber 56 flows into the diffuser 38 toward the downstream side of the discharge flow path 32 before reaching the central portion 58 of the tubular portion 50. On the other hand, the cooling gas guided from the introducing chamber 56 to the central portion 58 of the tubular portion 50 via the introducing flow path 68 of the guide portion 52 flows into the tubular portion 50 toward the upstream side of the discharge flow path 32. Inside the tubular portion 50, the exhaust gas and the cooling gas are well mixed by the swirling component of the exhaust gas. In the example of FIG. 7, the cooling gas does not flow to the communication passage 54. The swirling component of the exhaust gas mixed with the cooling gas is changed into the straight component by the plurality of guide portions 52. The exhaust gas from which the swirling component has been removed is guided to the diffuser 38.

According to the present embodiment, the exhaust gas is discharged from the gas turbine engine 24 to the communication passage 54. The exhaust gas contains the swirling component with the negative pressure at the center of the swirling component. Therefore, the cooling gas is drawn from the guide portion 52 to the communication passage 54 via the radially central portion 58 of the tubular portion 50. Thus, the cooling gas and the exhaust gas can be well mixed by the swirling component of the exhaust gas in the communication passage 54 or the tubular portion 50. The exhaust gas mixed with the cooling gas is discharged to the downstream side of the discharge flow path 32 through the outer peripheral side of the inside of the tubular portion 50 (the outside of the central portion 58).

The present embodiment is not limited to the above-described configuration. The introducing flow path 68 provided at the guide portion 52 may be closed, not opening toward the downstream side of the discharge flow path 32.

With respect to the above disclosure, we further disclose the following Supplemental Notes.

Supplemental Note 1

A gas mixing device (10) includes a discharge flow path (32) that discharges exhaust gas from a gas turbine engine (24), and the gas mixing device mixing the exhaust gas flowing through the discharge flow path with a cooling gas flowing through a radiator (40), wherein the discharge flow path includes a tubular portion (50), a communication passage (54) that allows an inside of the tubular portion and the gas turbine engine to communicate with each other, and a plurality of guide portions (52) that extend radially inward from the tubular portion and guide the cooling gas to a radially central portion (58) of the tubular portion, the plurality of guide portions are spaced from each other in a circumferential direction of the tubular portion, and the extended end portions of the plurality of guide portions are spaced from each other.

According to such a configuration, the exhaust gas containing the swirling component that has the negative pressure at the center is discharged from the gas turbine engine into the communication passage. Therefore, the cooling gas is drawn from the guide portion to the communication passage via the radially central portion of the tubular portion. Thus, the cooling gas and the exhaust gas can be well mixed by the swirling component of the exhaust gas inside the tubular portion or the communication passage. The exhaust gas mixed with the cooling gas is discharged to the downstream side of the discharge flow path through the outer peripheral side of the inside of the tubular portion.

Supplemental Note 2

In the gas mixing device according to Supplemental Note 1, the gas turbine engine may discharge the exhaust gas containing a swirling component with a negative pressure at the center of the swirling component.

Supplemental Note 3

In the gas mixing device according to Supplemental Note 1 or 2, the central portion of the inside of the tubular portion that is surrounded by the extended end portions of the plurality of guide portions may be in communicate with the communication passage located upstream of the tubular portion in the discharge flow path.

Supplemental Note 4

In the gas mixing device according to Supplemental Note 2, a diffuser (38) may be provided in the discharge flow path on the downstream side of the tubular portion, and the plurality of guide portions may remove the swirling component of the exhaust gas and let the exhaust gas flow to the diffuser.

According to such a configuration, the swirling component of the exhaust gas can be removed by the guide portion and thus the exhaust gas can flow smoothly into the diffuser.

Supplemental Note 5

In the gas mixing device according to Supplemental Note 4, the guide portion may be twisted around a radially inward direction of the tubular portion.

According to such a configuration, the swirling component of the exhaust gas can be satisfactorily removed by the guide portion.

Supplemental Note 6

In the gas mixing device according to any one of Supplemental Note 1 to 5, each of the plurality of guide portions may include a pair of side wall portions (62, 64) that extend radially inward from the tubular portion and are arranged to face each other in the circumferential direction of the tubular portion, and a connecting portion (66) that connects end portions of the pair of side wall portions on an upstream side of the discharge flow path, and wherein an introducing flow path (68) may be provided between the pair of side wall portions to guide the cooling gas to the central portion of the tubular portion.

According to such a configuration, the guide portion can be made into a simple configuration. In addition, the cooling gas can be introduced into the central portion of the tubular portion via the introducing flow path of the guide portion.

Supplemental Note 7

In the gas mixing device according to Supplemental Note 6, the introducing flow path may open toward the downstream side of the discharge flow path.

According to such a configuration, the guide portion can be made into an even simpler configuration.

Supplemental Note 8

In the gas mixing device according to any one of Supplemental Notes 1 to 7, the guide portion may be provided at the end portion of the tubular portion on the downstream side of the discharge flow path.

According to such a configuration, the guide portion can be easily provided in the tubular portion.

Supplemental Note 9

The gas mixing device according to Supplemental Note 6 may further include a housing portion (48) that houses the tubular portion, wherein an introducing chamber (56) into which the cooling gas is introduced is provided between the outer peripheral surface of the tubular portion and the housing portion, and the introducing flow path includes an outer end (68*a*) that is located on the outer peripheral surface of the tubular portion and an inner end (68*b*) that is located on an inner side of the tubular portion.

According to such a configuration, the cooling gas introduced into the introducing chamber can be guided to the central portion of the tubular portion via the introducing flow path.

Supplemental Note 10

In the gas mixing device according to Appendix 9, the size of the inner end of the introducing flow path may be smaller than the size of the outer end of the introducing flow path.

According to such a configuration, the cooling gas can be smoothly drawn into the communication passage via the introducing flow path.

Supplemental Note 11

In the gas mixing device according to any one of Supplemental Notes 1 to 10, the inner diameter of the tubular portion may be enlarged toward the downstream side of the discharge flow path.

According to such a configuration, the mixed gas flowing through the tubular portion can flow well to the downstream side of the discharge flow path.

Supplemental Note 12

The moving object (12) includes the gas mixing device according to any one of Supplemental Notes 1 to 11.

The present invention is not limited to the above-described disclosure, and various configurations can be adopted without departing from the scope of the present invention.

The invention claimed is:

1. A gas mixing device comprising a discharge flow path that discharges an exhaust gas from a gas turbine engine, the gas mixing device mixing the exhaust gas flowing through the discharge flow path with a cooling gas flowing through a radiator, wherein the discharge flow path includes:

a tubular portion;

a communication passage that allows an inside of the tubular portion and the gas turbine engine to communicate with each other; and a plurality of guide portions that extend radially inward from the tubular portion and guide the cooling gas to a radially central portion of the tubular portion, the plurality of guide portions are spaced from each other in a circumferential direction of the tubular portion, extended end portions of the plurality of guide portions are spaced from each other, and the extended end portions of the plurality of guide portions are open.

2. The gas mixing device according to claim 1, wherein the gas turbine engine includes a turbine, and the turbine rotates, whereby the gas turbine engine discharges the exhaust gas containing a swirling component that has a negative pressure at a center of the swirling component.

3. The gas mixing device according to claim 1, wherein the central portion of the inside of the tubular portion that is surrounded by the extended end portions of the plurality of guide portions is in communication with the communication passage located upstream of the tubular portion in the discharge flow path.

4. The gas mixing device according to claim 2, wherein a diffuser is provided in the discharge flow path on a downstream side of the tubular portion, and the plurality of guide portions remove the swirling component of the exhaust gas and let the exhaust gas flow to the diffuser.

5. The gas mixing device according to claim 4, wherein each of the guide portions is twisted around a radially inward direction of the tubular portion.

6. The gas mixing device according to claim 1, wherein each of the plurality of guide portions includes:

a pair of side wall portions that extend radially inward from the tubular portion and are arranged to face each other in the circumferential direction of the tubular portion; and a connecting portion that connects end portions of the pair of side wall portions on an upstream side of the discharge flow path, and an introducing flow path is provided between the pair of side wall portions to guide the cooling gas to the central portion of the tubular portion.

7. The gas mixing device according to claim 6, wherein the introducing flow path is open toward a downstream side of the discharge flow path.

8. The gas mixing device according to claim 1, wherein each of the guide portions is provided at an end portion of the tubular portion on a downstream side of the discharge flow path.

9. The gas mixing device according to claim 6, further comprising a housing portion that houses the tubular portion, wherein an introducing chamber into which the cooling gas is introduced is provided between an outer peripheral surface of the tubular portion and the housing portion, and the introducing flow path includes:

an outer end that is located on the outer peripheral surface of the tubular portion; and an inner end that is located on an inner side of the tubular portion.

10. The gas mixing device according to claim 9, wherein a size of the inner end of the introducing flow path is smaller than a size of the outer end of the introducing flow path.

11. The gas mixing device according to claim 1, wherein an inner diameter of the tubular portion is enlarged toward a downstream side of the discharge flow path.

12. A moving object comprising the gas mixing device according to claim 1.

13. The gas mixing device according to claim 1, wherein an inside of the tubular portion includes a space that is adjacent to an upstream side of the central portion surrounded by the extended end portions and that allows exhaust gas to flow through.

14. A gas mixing device comprising a discharge flow path that discharges an exhaust gas from a gas turbine engine, the gas mixing device mixing the exhaust gas flowing through the discharge flow path with a cooling gas flowing through a radiator, wherein the discharge flow path includes:

a tubular portion;

a communication passage that allows an inside of the tubular portion and the gas turbine engine to communicate with each other; and a plurality of guide portions that extend radially inward from the tubular portion and guide the cooling gas to a radially central portion of the tubular portion, the plurality of guide portions are spaced from each other in a circumferential direction of the tubular portion, extended end portions of the plurality of guide portions are spaced from each other, and an inside of the tubular portion includes a space that is adjacent to an upstream side of the central portion surrounded by the extended end portions and that allows exhaust gas to flow through.

15. The gas mixing device according to claim 14, wherein the gas turbine engine includes a turbine, and the turbine rotates, whereby the gas turbine engine discharges the exhaust gas containing a swirling component that has a negative pressure at a center of the swirling component.

16. The gas mixing device according to claim 15, wherein a diffuser is provided in the discharge flow path on a downstream side of the tubular portion, the plurality of guide portions remove the swirling component of the exhaust gas and let the exhaust gas flow to the diffuser, and each of the guide portions is twisted around a radially inward direction of the tubular portion.

17. The gas mixing device according to claim 14, wherein each of the plurality of guide portions includes:

a pair of side wall portions that extend radially inward from the tubular portion and are arranged to face each other in the circumferential direction of the tubular portion; and a connecting portion that connects end portions of the pair of side wall portions on an upstream side of the discharge flow path, and an introducing flow path is provided between the pair of side wall portions to guide the cooling gas to the central portion of the tubular portion.

18. The gas mixing device according to claim 17, further comprising a housing portion that houses the tubular portion, wherein an introducing chamber into which the cooling gas is introduced is provided between an outer peripheral surface of the tubular portion and the housing portion, and the introducing flow path includes:

an outer end that is located on the outer peripheral surface of the tubular portion; and an inner end that is located on an inner side of the tubular portion.

19. The gas mixing device according to claim 18, wherein a size of the inner end of the introducing flow path is smaller than a size of the outer end of the introducing flow path.

20. A gas mixing device comprising a discharge flow path that discharges an exhaust gas from a gas turbine engine, the gas mixing device mixing the exhaust gas flowing through the discharge flow path with a cooling gas flowing through a radiator, wherein the discharge flow path includes:

a tubular portion;

a communication passage that allows an inside of the tubular portion and the gas turbine engine to communicate with each other; and a plurality of guide portions that extend radially inward from the tubular portion and guide the cooling gas to a radially central portion of the tubular portion, the plurality of guide portions are spaced from each other in a circumferential direction of the tubular portion, extended end portions of the plurality of guide portions are spaced from each other, the plurality of guide portions are formed in a manner so that the cooling gas flows along a radial direction of the tubular portion and is guided to the central portion of the tubular portion, and at least part of the cooling gas guided by the plurality of guide portions flows through the central portion of the tubular portion toward an upstream side of the plurality of guide portions.

* * * * *